(12) United States Patent
Smith et al.

(10) Patent No.: US 7,376,815 B2
(45) Date of Patent: May 20, 2008

(54) METHODS AND APPARATUS TO INSURE CORRECT PREDECODE

(75) Inventors: Rodney Wayne Smith, Raleigh, NC (US); James Norris Dieffenderfer, Apex, NC (US); Jeffrey Todd Bridges, Raleigh, NC (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 11/066,957

(22) Filed: Feb. 25, 2005

(65) Prior Publication Data

US 2006/0195830 A1    Aug. 31, 2006

(51) Int. Cl.
    *G06F 9/30*    (2006.01)
(52) U.S. Cl. ...................................... 712/213
(58) Field of Classification Search ............... 712/213
    See application file for complete search history.

(56) References Cited

U.S. PATENT DOCUMENTS

| | | | | |
|---|---|---|---|---|
| 5,448,746 A | * | 9/1995 | Eickemeyer et al. | 712/210 |
| 6,192,465 B1 | * | 2/2001 | Roberts | 712/212 |
| 6,247,097 B1 | * | 6/2001 | Sinharoy | 711/125 |
| 6,253,309 B1 | * | 6/2001 | Mahalingaiah | 712/213 |
| 2004/0107217 A1 | * | 6/2004 | Hastings | 707/104.1 |

FOREIGN PATENT DOCUMENTS

WO      05116819      12/2005

* cited by examiner

*Primary Examiner*—Eddie Chan
*Assistant Examiner*—John Lindlof
(74) *Attorney, Agent, or Firm*—Thomas Rouse; Nicholas J. Pauley; Joseph B. Agusta (57) ABSTRACT

Techniques for ensuring a synchronized predecoding of an instruction string are disclosed. The instruction string contains instructions from a variable length instruction set and embedded data. One technique includes defining a granule to be equal to the smallest length instruction in the instruction set and defining the number of granules that compose the longest length instruction in the instruction set to be MAX. The technique further includes determining the end of an embedded data segment, when a program is compiled or assembled into the instruction string and inserting a padding of length, MAX-1, into the instruction string to the end of the embedded data. Upon predecoding of the padded instruction string, a predecoder maintains synchronization with the instructions in the padded instruction string even if embedded data is coincidentally encoded to resemble an existing instruction in the variable length instruction set.

20 Claims, 11 Drawing Sheets

METHODS AND APPARATUS TO INSURE CORRECT PREDECODE

BACKGROUND OF THE INVENTION

1. Field of the Invention

The present invention relates generally to eliminating predecode synchronization errors in a processor pipeline which processes instructions having a variety of lengths, and, more particularly, to advantageous techniques for padding program code such that a predecode engine correctly recognizes variable length instructions as instructions when predecoding an instruction string including embedded data.

2. Relevant Background

Today's processors typically support instruction sets having variable length instructions. For example, the ARM® instruction set consists of instructions having 32 bit lengths and instructions having 16 bit lengths. Pipelined processors which support variable length instructions may contain a predecode pipeline stage for partially decoding an instruction in order to simplify a subsequent decode stage and, thus, streamline the pipeline. A typical predecode pipeline stage checks, on a code line by code line basis, through program code, predecodes a code line, and writes the predecoded information into a cache along with the code line. Depending on the compiler used to create the program or object code, the program code may contain embedded data along with instructions.

Embedded data may coincidentally appear to resemble an instruction or a portion of an instruction. In such a case, a predecode engine would typically misinterpret embedded data. Thus, where the predecode engine incorrectly predecodes 16 bits of data as the first part of a 32 bit instruction, a subsequent 16 bit instruction might then in turn be interpreted as the second half of the 32 bit instruction so that invalid predecoded information would be stored in cache and the predecoding process might become out of synchronization for predecoding the next instruction. Typically, it would not be until a subsequent decode stage that the synchronization error is recognized. Such synchronization error results in processor delay and useless power consumption when attempting to recover from the predecode error.

Conventional approaches to the above problem include providing a recovery mechanism to resynchronize the predecode engine.

SUMMARY OF THE DISCLOSURE

Among its several aspects, a first embodiment of the invention recognizes that a need exists for a technique which precludes a predecode engine from having to resynchronize when embedded data is coincidentally encoded as an instruction in an instruction stream where the instruction stream contains instructions from a variable length instruction set and embedded data. To this end, this embodiment includes defining a granule to be equal to the smallest length instruction in the instruction set and defining the number of granules that compose the longest length instruction in the instruction set to be MAX. The embodiment further includes determining the end of an embedded data segment, when a program is compiled or assembled into the instruction string and inserting a padding of length, MAX−1, into the instruction string to the end of the embedded data. Upon subsequent predecoding of the padded instruction stream, a predecoder advantageously maintains synchronization with the instructions in the padded instruction stream even if embedded data coincidentally resembles an existing instruction or portion of an instruction in the variable length instruction set.

A more complete understanding of the present invention, as well as further features and advantages of the invention, will be apparent from the following Detailed Description and the accompanying drawings.

DETAILED DESCRIPTION

The present invention will now be described more fully with reference to the accompanying drawings, in which several embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

It will be appreciated that the present invention may be embodied as methods, systems, or computer program products. Accordingly, the present invention may take the form of a hardware embodiment, a software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, flash memories, or magnetic storage devices.

Computer program code which may be compiled, assembled, predecoded after compiling or assembly, or the like in accordance with the teachings of the invention may be initially written in a programming language such as C, C++, native Assembler, JAVA®, Smalltalk, JavaScript®, Visual Basic®, TSQL, Perl, or in various other programming languages. Program code or computer readable medium refers to machine language code such as object code whose format is understandable by a processor. Software embodiments of the invention do not depend upon their implementation with a particular programming language.

Figure 1:
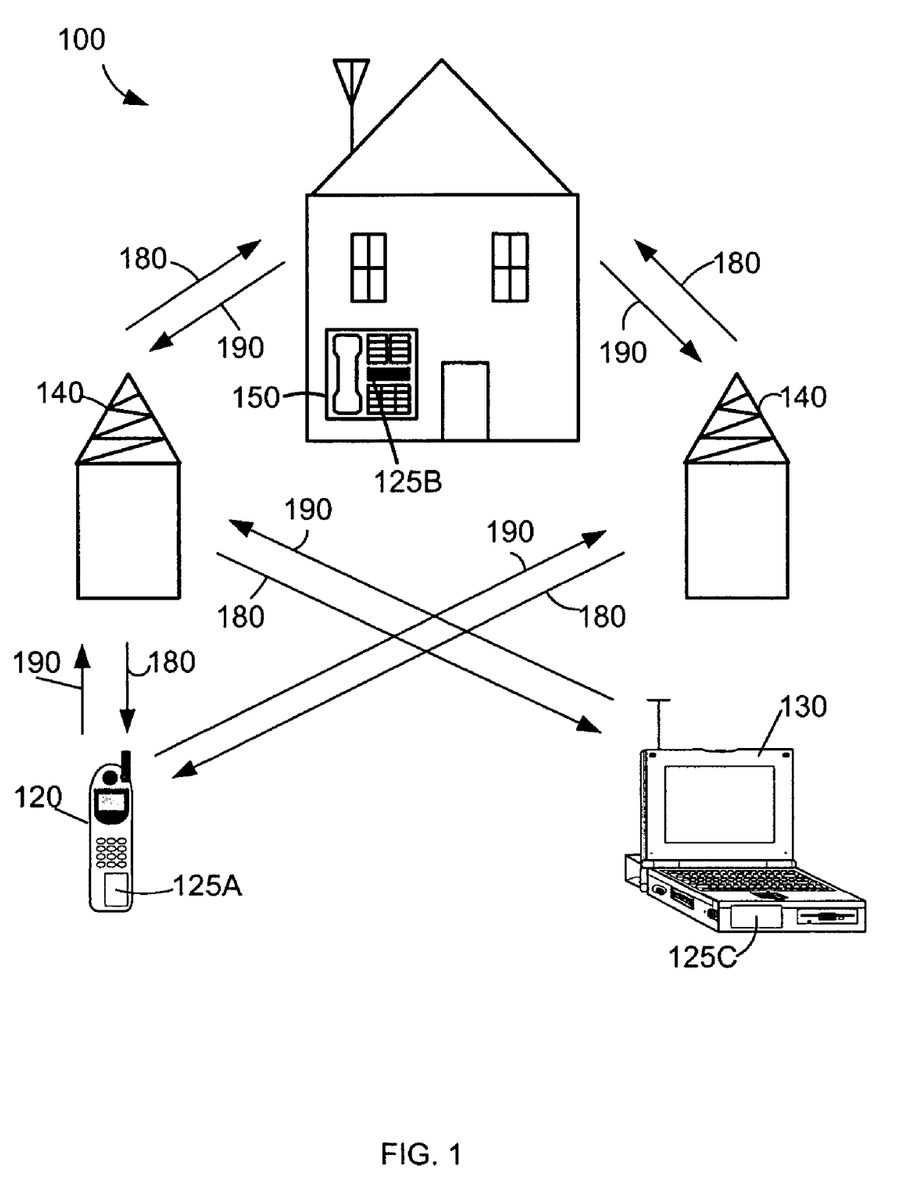
FIG. 1 shows an exemplary wireless communication system in which an embodiment of the invention may be advantageously employed.

FIG. 1 shows an exemplary wireless communication system 100 in which an embodiment of the invention may be advantageously employed. For purposes of illustration, FIG. 1 shows three remote units 120, 130, and 150 and two base stations 140. It will be recognized that typical wireless communication systems may have many more remote units and base stations. Remote units 120, 130, and 150 include hardware components executing program code 125A, 125B, and 125C, respectively. Program code 125A, 125B, and 125C, is modified according to the teachings of the invention as discussed further below. FIG. 1 shows a forward link signal 180 from the base stations 140 and the remote units 12, 13, and 15 and a reverse link signal 190 from the remote units 12, 13, and 15 to base stations 140.

In FIG. 1, remote unit 120 is shown as a mobile telephone, remote unit 130 is shown as a portable computer, and remote unit 150 is shown as a fixed location remote unit in a wireless local loop system. For example, the remote units may be cell phones, hand-held personal communication systems (PCS) units, portable data units such as personal data assistants, or fixed location data units such as meter reading equipment. Although FIG. 1 illustrates remote units according to the teachings of the invention, the invention is not limited to these exemplary illustrated units. The invention may be suitably employed in any pipelined processing environment where a predecode stage or engine is utilized to predecode an instruction string including variable length instructions and embedded data.

Figure 2:
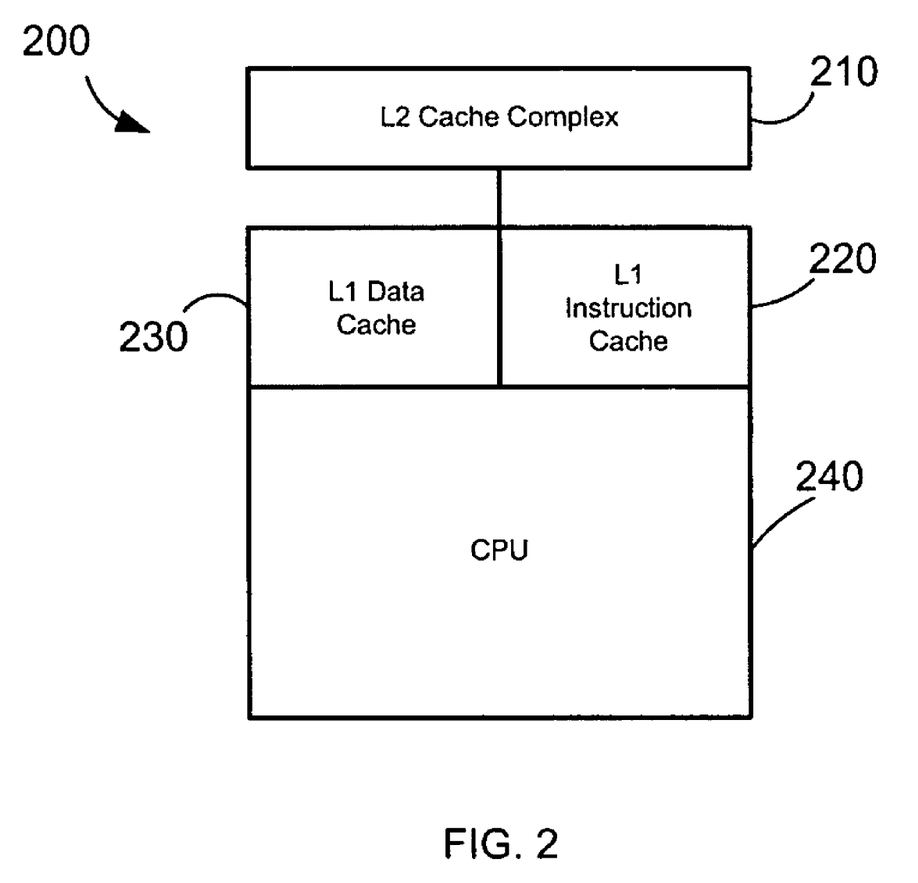
FIG. 2 is a block diagram of a processor complex in which an embodiment of the invention may be advantageously employed.

FIG. 2 shows a processor complex 200 in which an embodiment of the invention may be advantageously employed. The processor complex 200 may be suitably employed for executing and storing program code 125A-C modified according to the teachings of the invention. The processor complex 200 includes a central processing unit (CPU) 240, a level 1 data cache 230, a level 1 instruction cache 220, and a level 2 instruction and data cache 210. The CPU 240 is coupled to the level 1 data cache 230, level 1 instruction cache 220, and the level 2 cache 210. The CPU 240 during a predecode stage predecodes program code and writes predecoded information with the program code to either the level 1 instruction cache 220 or to the level 2 cache 210, if the level 1 instruction cache is full. The CPU 240 retrieves instructions and data from the caches in a hierarchical fashion. For example, when the CPU 240 needs to fetch an instruction, CPU 240 will access the level 1 instruction cache 220 to determine a match. If there is no match in the level 1 instruction cache 220, CPU 240 will access the level 2 instruction and data cache 210. Similarly, when the CPU 240 needs to fetch data, CPU 240 will access level 1 data cache 230 to determine a match. If there is no match in the level 1 data cache 230, CPU 240 will access the level 2 instruction and data cache 210. The embodiments of the invention are not limited to the illustrated processor complex 200 and are further applicable to any processor complex utilizing a predecode engine, such as any reduced instruction set computer (RISC) processors, by way of example. It will be recognized the invention is not limited to the RISC environment.

Figure 3:
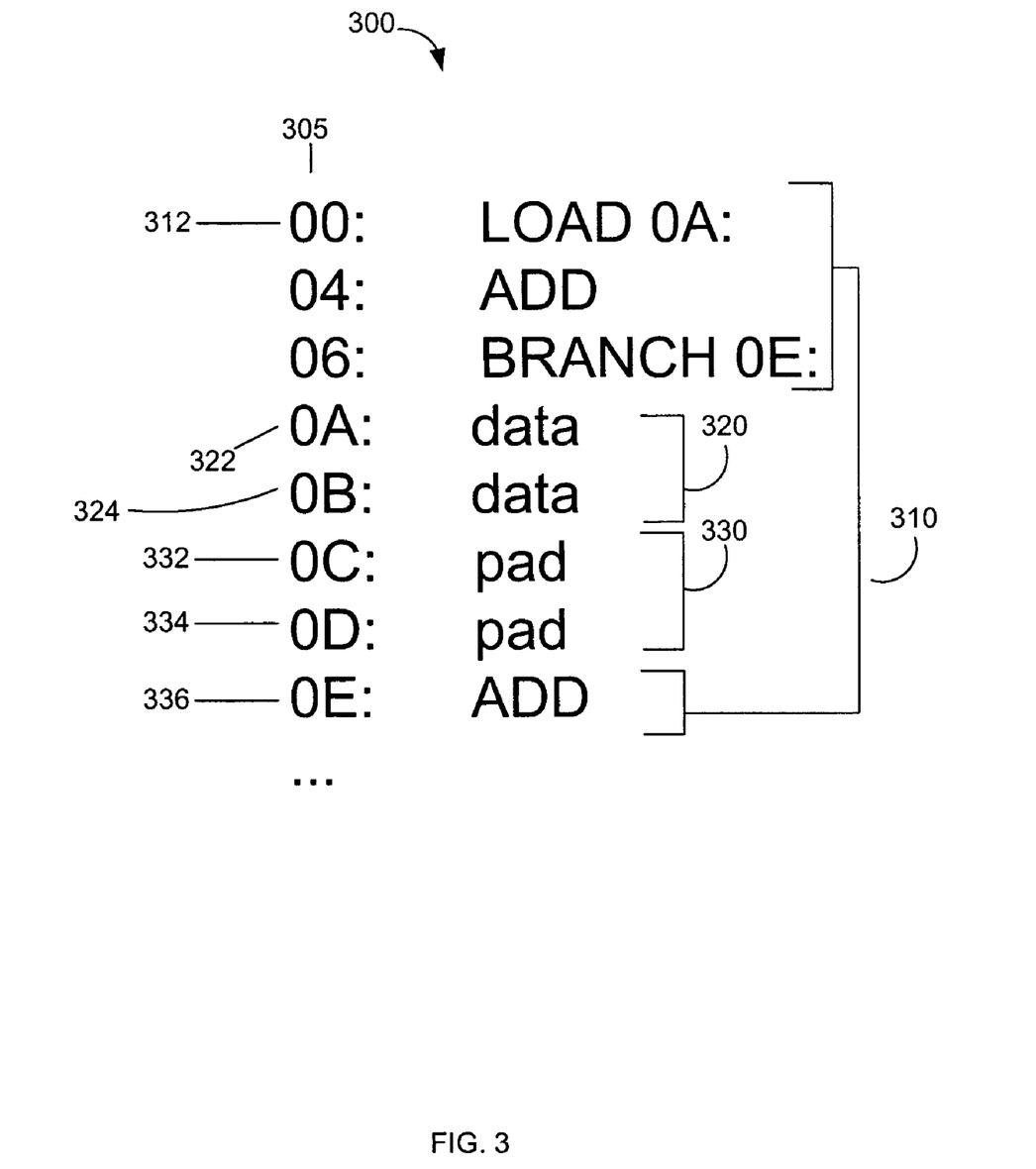
FIG. 3 shows an illustrative program segment containing padding for a varying length instruction set having instruction sizes of 16 and 32 bits in accordance with a first embodiment of the invention in which a fixed length pad is utilized.

FIG. 3 shows an illustrative program segment 300 containing padding in accordance with a first embodiment of the invention in which a constant length pad is inserted. Program segment 300 may be suitably stored as a cache line or lines of a level 2 cache, such as level 2 cache 210 or in program memory. It should be noted that although for illustration purposes the program segment is assumed to be retrieved from a cache line or lines, the teachings of the invention are applicable to the processing of the program segment regardless of the memory device from which the program segment is retrieved. Since a cache line typically has a fixed length, the terms instruction string or instruction stream typically refer to one or more program segments which may or may not span the boundary of a cache line. Furthermore, the program segment 300 may also illustrate a portion of a cache line.

The illustrative program segment 300 includes instructions 310, embedded data 320, and padding 330. Instructions 310 come from a variable length instruction set. Several exemplary instructions are illustrated in FIG. 3 from the variable length instruction set. The instructions in the variable length instruction set, in this example, are either 16 or 32 bits long. For illustrative purposes, a byte indicator 305 illustrates the byte location in the cache line where an instruction begins and indicates the size of the instruction. For example, the LOAD 0A instruction begins at byte position 00 and ends at byte position 03. Thus, LOAD 0A is a 32 bit instruction. Similarly, the ADD instructions are 16 bits long and the BRANCH instruction is 32 bits long. In program segment 300, embedded data bytes 322 and 324 follow the BRANCH instruction. Pad bytes 332 and 334 of padding 330 were inserted according to the teaching of the invention after data byte 324. ADD instruction 336 follows pad byte 334.

The embedded data 320 is not immediate data and, in general, is related to a nearby instruction in a program segment such as LOAD instruction 312. The locality of embedded data, in general, is a matter of convenience for the standard compiler. Many standard compilers, such as the ARM® compiler, typically generate embedded data 320 within a program segment. One reason a standard compiler may embed data unrelated to the adjacent instructions is to allow nearby instructions to more easily access the data space. For example, load instructions would be allowed to use fewer bits of offset when addressing the data. Referring to FIG. 3, LOAD 0A instruction 312 loads data bytes 322 and 324 which begin at offset 0A.

To illustrate an advantageous feature of the invention by way of an example, we first describe the situation in which the embedded data 320 coincidentally looks like the first two bytes of a 32 bit LOAD instruction and the padding 330 has not been added. In this circumstance, during a predecode operation of a pipeline processor, a predecoder processes the cache line by checking through the instructions of the cache line by checking 16 bits at a time.

The predecoder partially decodes each instruction and subsequently writes the entire cache line along with predecoded information back to cache such as level 1 instruction cache 220, and, if the level 1 cache is full, to the level 2 cache 210. Predecoded information, in general, may include information such as where an instruction starts in a cache line for a subsequent decode operation, whether an instruction is a load or store instruction, whether an instruction is arithmetic, whether an instruction is the first or second half of a larger instruction, whether an instruction is complex, and the like. Due to the presence of embedded data 320 which we have assumed looks like the first portion of a LOAD instruction, the embedded data will be incorrectly interpreted as part of a LOAD instruction by a predecoder. In this instance, the subsequent ADD instruction 336 would be incorrectly predecoded as the second half of a LOAD instruction.

Turning to the operation of the predecoder with padding 330 added as shown in FIG. 3, the predecoder would step through the cache line 300 on a granule by granule basis. A granule is a unit of measure equal to the size of the shortest length instruction in a variable length instruction set. For this example, the instruction set contains 16 bit and 32 bit long instructions. Thus, one granule equals 16 bits. In general, the size of embedded data is a multiple of a granule for the instruction set. With regard to program segment 300, the predecoder first checks the first granule, the first 16 bits of the LOAD 0A instruction 312, followed by the second granule, the second 16 bits of the LOAD 0A instruction 312. Secondly, the predecoder checks the next granule, the 16 bits of the 16 bit ADD instruction. Thirdly, the predecoder checks the next granule, the first 16 bits of the BRANCH 0E instruction, followed by the next granule, the second 16 bits of the BRANCH 0E instruction. Since the embedded data 320 appears to be the first 16 bits of a LOAD instruction, the predecoder predecodes embedded data 320 followed by padding 330 as if they together constituted a 32 bit LOAD instruction. Thus, due to the inserted padding according to the teachings of the invention, the predecoder advantageously maintains synchronization with the next instruction in the cache line so that when it checks the next granule, the ADD instruction beginning at byte position 0E, it correctly recognizes the ADD instruction. As discussed above, without the inserted padding, the predecoder would predecode the ADD instruction 336 as if it were the remaining 16 bits of the LOAD instruction, resulting in the predecoder incorrectly predecoding ADD instruction 336 and possibly subsequent instructions as well.

Once the cache line has been predecoded, the cache line and predecode information is written to cache and ready for a subsequent decode and execute operation. It should be noted that the predecoder may have generated some invalid predecode information due to predecoding embedded data and padding 330 as the remaining 16 bits of the LOAD instruction. Such invalid predecode information is of no concern because when the program actually executes, by virtue of the flow of a program, a program counter will not be directed to execute embedded data or embedded padding. For example, after executing the instruction BRANCH 0E, the program counter would point to address 0E and cause the ADD instruction 336 to be executed next, bypassing embedded data 320 and padding 330 and any associated invalid predecode information.

Figure 4:
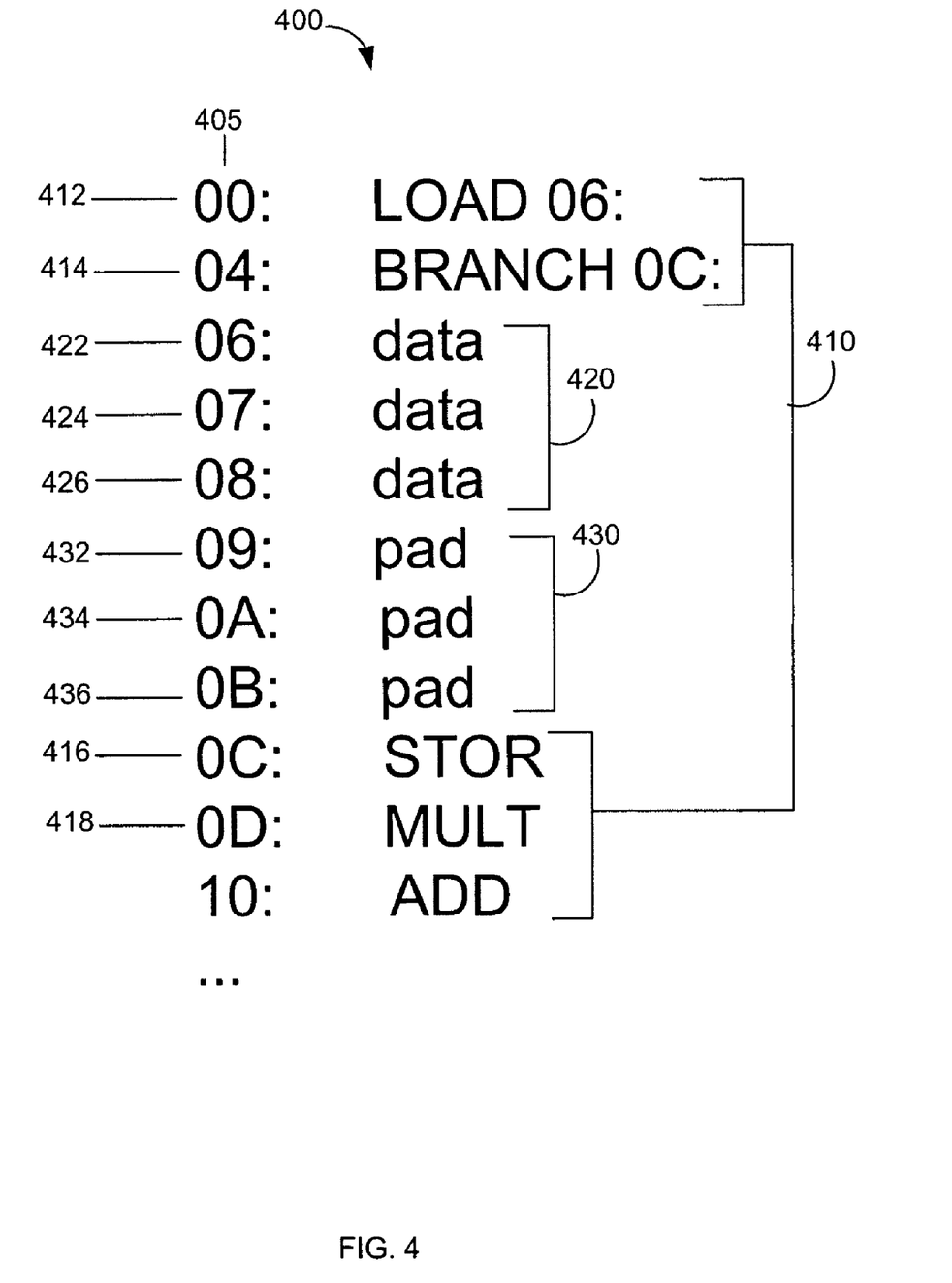
FIG. 4 shows an illustrative program segment containing three pad bytes for a varying length instruction set having instruction sizes of 8, 16, 24, and 32 bits in accordance with the first embodiment of the invention.

FIG. 4 shows an illustrative program segment 400 containing three pad bytes for a varying length instruction set having instruction sizes of 8, 16, 24, and 32 bits in accordance with the first embodiment of the invention. Program segment 400 may be suitably stored as part of a cache line, a cache line, or multiple cache lines of a level 2 cache such as level 2 cache 210. Alternatively, the program segment 400 may be stored in some other form of program memory. The program segment includes instructions 410, embedded data 420, and padding 430. In this example, instructions 410 come from a variable length instruction set having lengths of 8, 16, 24, or 32 bits long. The granule size for the variable length instruction set is 8 bits or 1 byte. For purposes of illustration, byte indicator 405 illustrates the byte location in the cache line. In program segment 400, embedded data 420 follows a 16 bit BRANCH instruction 414. Pad bytes 432, 434, and 436 of padding 430 were inserted according to the teaching of the invention after data byte 426 at byte positions 09, 0A, and 0B, respectively. Store (STOR) instruction 416, an 8 bit instruction, follows pad byte 436 and begins at byte position 0C. A multiply (MULT) instruction 418, a 24 bit instruction, begins in the next byte position 0D.

Since the smallest instruction in this example is one byte, a granule is one byte. A predecoder will check one granule at a time when processing the program segment 400. For all program segments 400, 500, and 600 of FIGS. 4-6, respectively, the predecoder operate on the first eight bytes of the corresponding program segment in the same way. To simplify the discussion, we will describe the operation of those eight bytes with reference to FIG. 4. The predecoder will check the first granule of LOAD 06 instruction 412, recognize that the first granule is a LOAD instruction and sequentially check the next three granules, byte positions 01-03, from the cache line to predecode the LOAD 06 instruction 412. The predecoder then will check the first granule of BRANCH 0C instruction 414, recognize that the first granule is a BRANCH 0C instruction, and sequentially check the next granule, byte position 05 from the cache line to predecode the BRANCH 0C instruction 414. Data bytes 422 and 424 are encoded differently from any instruction in the varying length instruction set. Thus, the predecoder will check the granule at byte position 06, recognize that it contains data and continue. It proceeds to check the next granule at byte position 07, data byte 424, and correctly recognizes that data byte 424 also contains data.

For the example illustrated in FIG. 4, data byte 426 coincidentally resembles the first 8 bits of a 32 bit instruction such as a LOAD instruction. Consequently, after the predecoder predecodes data byte 426 as the first portion of a 32 bit LOAD instruction, the predecoder will consider the next 3 granules, pad bytes 432, 434, and 436, as if those three bytes were the remainder of this coincidental LOAD instruction. Due to padding 430, the next instruction, STOR instruction 416, will be correctly predecoded, thus, maintaining the synchronization between the predecoder and the instructions in the cache line. Without padding 430 inserted, the predecoder would misinterpret bytes corresponding to STOR instruction 416 and MULT instruction 418 as bytes corresponding to the last 3 bytes of the coincidental LOAD instruction, resulting in the predecoder predecoding STOR instruction 416 as the second byte of the coincidental LOAD instruction and the first two bytes of the MULT instruction 418 as the last two bytes of the coincidental LOAD instruction, thus causing the predecoder to be out of synchronization with the instructions in the cache line.

As a further example, if data byte 426 of FIG. 4 was encoded to coincidentally resemble the first 8 bits of a 24 bit instruction such as a MULT instruction, the predecoder would check the next two granules, pad bytes 432 and 434, as if those two bytes belonged to the coincidental MULT instruction. The predecoder would then check the next granule, pad byte 436. If pad byte 436 was encoded as an 8 bit instruction or encoded as data distinct from the instruction set as addressed further below, the precoder would check the next granule found at byte position 0C, the STOR instruction 416. This example illustrates that regardless of how data byte 426 is misinterpreted, the padding 430 preserves the integrity of the recognition of an instruction following embedded data.

Figure 5:
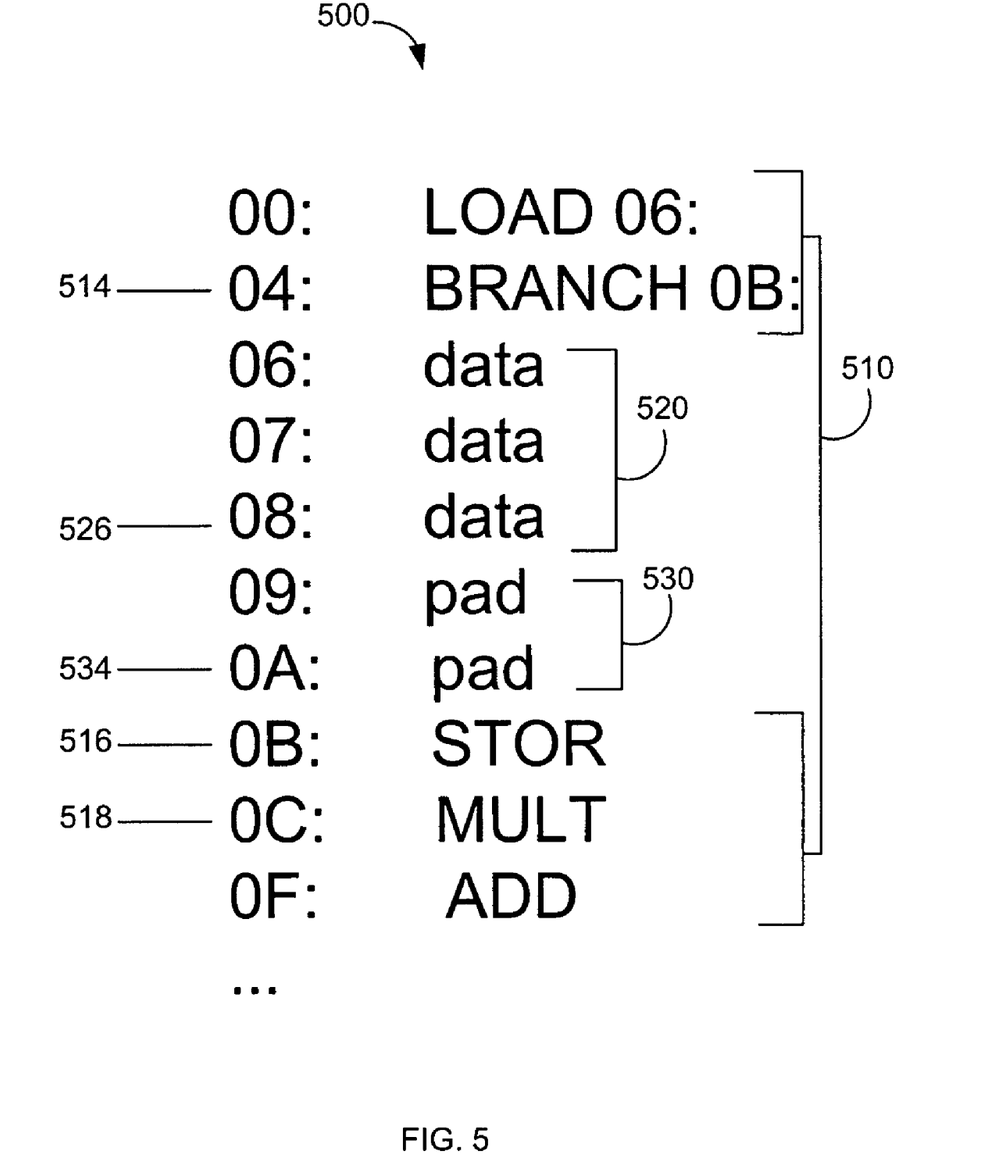
FIG. 5 shows an illustrative program segment containing two pad bytes for a varying length instruction set having instruction sizes of 8, 16, 24, and 32 bits in accordance with a second embodiment of the invention in which a variable length pad is utilized.

FIG. 5 shows an illustrative program segment 500 containing two pad bytes for a varying length instruction set having instruction sizes of 8, 16, 24, and 32 bits in accordance with a second embodiment of the invention in which a varying pad size is employed. FIG. 5 illustrates how another size padding may be inserted into program code depending on how embedded data which resembles an instruction would be misinterpreted by a predecoder. Using varying length padding advantageously reduces program code size. Program segment 500 includes instructions 510, data 520, and padding 530. Program segment 500 is the same as program segment 400 except that program segment 500 has one less pad byte in padding 530 and, thus, the instructions following the pad byte 534 are shifted up one byte position in the cache line. Due to the shifting, the target address of the BRANCH 0B instruction 514 is decremented by one byte.

The example illustrated in FIG. 5 involves a data byte 526 which coincidentally resembles the first 8 bits of a 24 bit instruction in the variable length instruction set. Thus, when the predecoder begins predecoding data byte 526, the predecoder will check the next two granules, pad bytes 532 and 534, as if those two bytes were the remainder of the coincidental 24 bit instruction. The predecoder will then check the next granule, STOR instruction 516, for predecoding, maintaining the synchronization between the predecoder and the instructions in the cache line. In the example illustrated in FIG. 5, a two byte padding suffices rather than a three byte padding used in FIG. 4.

Without padding 530 inserted, the predecoder would misinterpret granules corresponding to STOR instruction 516 and MULT instruction 518 as bytes corresponding to the last two bytes of the coincidental 24 bit instruction, resulting in the predecoder being out of synchronization with the cache line. Thus, the integrity of the recognition of an instruction following embedded data is jeopardized.

Figure 6:
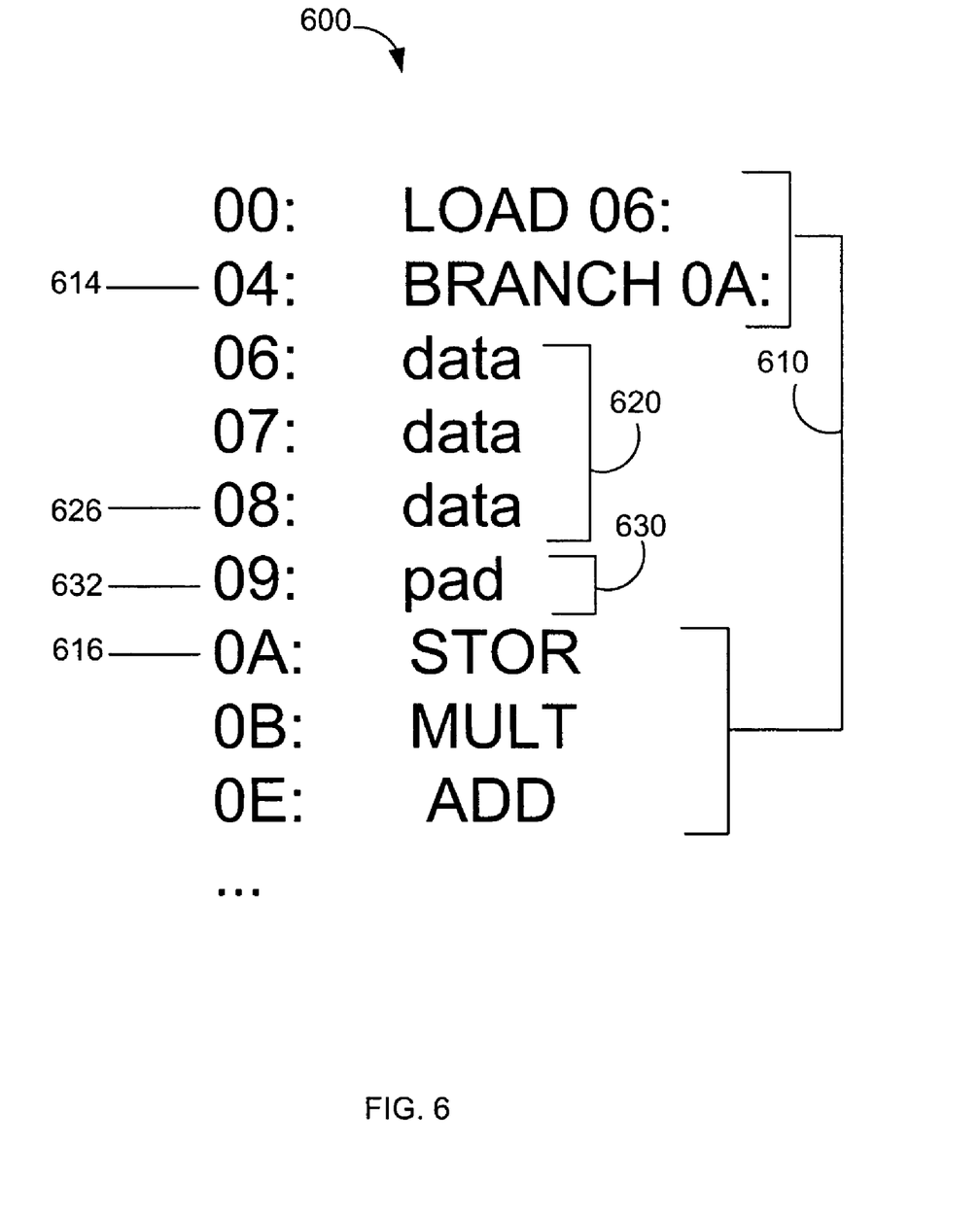
FIG. 6 shows an illustrative program segment containing one pad byte for a varying length instruction set having instruction sizes of 8, 16, 24, and 32 bits in accordance with the second embodiment of the invention.

FIG. 6 shows an illustrative program segment 600 containing one pad byte for a varying length instruction set having instruction sizes of 8, 16, 24, and 32 bits in accordance with the second embodiment of the invention. FIG. 6 illustrates how only one pad byte may be inserted into program code depending on how data would be misinterpreted by a predecoder. Program segment 600 includes instructions 610, data 620, and padding 630. Program segment 600 is the same as program segment 500 except that program segment 600 has one less pad byte in padding 630 and, thus, the instructions following the pad byte 632 are shifted up one byte position in the cache line. Due to the shifting, the target address of BRANCH 0A instruction 614 is decremented by one byte.

The example illustrated in FIG. 6 involves a data byte 626 which coincidentally resembles the first 8 bits of a 16 bit instruction in the variable length instruction set. When the predecoder begins predecoding data byte 626, the predecoder will check the next granule, pad byte 632, as if the pad byte 632 belonged to the 16 bit instruction indicated by data byte 626. The predecoder will then check the next granule, STOR instruction 616, for predecoding, maintaining the synchronization between the predecoder and the instructions in the cache line. In the example illustrated in FIG. 6, since the data byte 632 resembles the first 8 bits of a 16 bit instruction, a padding of size one byte would suffice.

As shown in the examples described in connection with FIGS. 5 and 6, the size of padding inserted after imbedded data may vary. Since a software compiler or assembler executing on a computer generates program code having instructions and embedded data as illustrated in FIGS. 3-6 from a higher level programming language, the compiler or assembler can recognize whenever embedded data resembles an instruction from a varying length instruction set and insert padding accordingly. As discussed further below, a fixed length or varying length padding can be applied.

Figure 7:
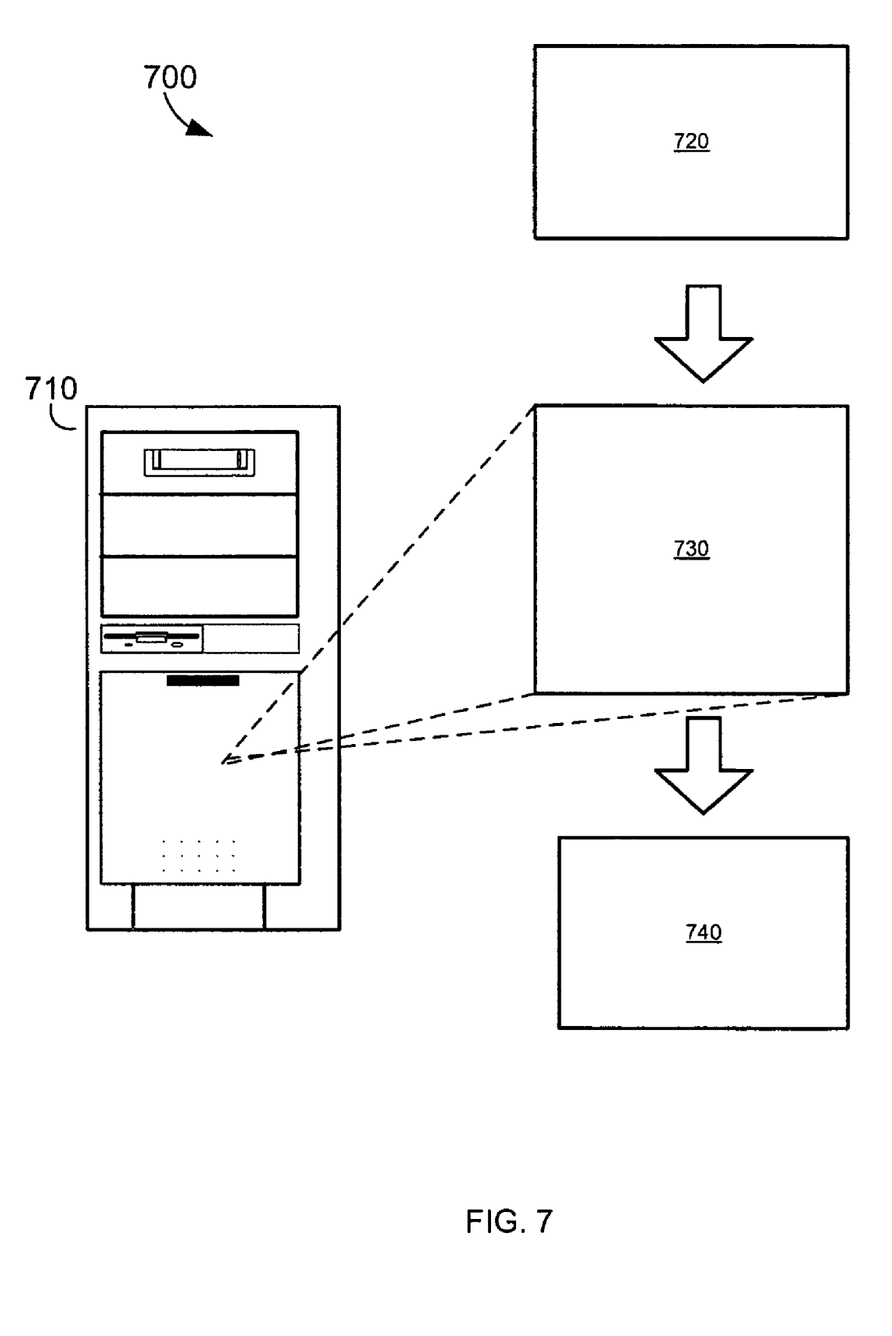
FIG. 7 is a block diagram of a computer executing software according to the teachings of the invention.

FIG. 7 is a block diagram 700 of a computer 710 executing software 730 according to the teachings of the invention. Although not illustrated, the computer 710 includes internal components such as a processor, memory, input/output devices, and a bus for communication between these internal components. Software 730 may suitably be a compiler or assembler which is modified according to the teachings of the invention. Software 730 resides in memory of computer 710. Software 730 receives a program 720 as input and generates compiled or assembled program code 740 with padding inserted in accordance with the invention as output. The program 720 may be written in C, C++, native Assembler, JAVA®, Smalltalk, JavaScript®, Visual Basic®, TSQL, Perl, or in various other programming languages. The program 720 is written to accomplish a particular function on a target processor such as one contained in a cell phone, hand-held PCS units, computer, and portable data units, while the program code 740 executes on the target processor. The target processor may or may not be different than the computer 710 which executes software 730.

Software 730 includes a means for parsing the program 720 to determine the structural contents of program 720 and if program 720 is syntactically valid. The means for parsing also converts the program 720 into an internal form. The software 730 further includes a means for code generation. The means for code generation translates the internal form into object code which can be executed by the target processor. The object code consists of one or more program segments having embedded data and instructions from a variable length instruction set. The software 730 further includes a means for inserting padding at the end of an embedded data segment.

To calculate the pad size to insert between imbedded data and a subsequent instruction, the software 730 includes an optional analyzing means for analyzing the content of an embedded data segment. An embedded data segment is embedded data in an instruction stream surrounded by instructions. The software 730 further includes an optional recognizing means. During the compilation of program 720, the recognizing means recognizes whether any granules within an embedded data segment were encoded to resemble a granule of an instruction in the instruction set. If so, the insertion means inserts a number of pad granules after the embedded data taking into consideration the length of instruction the granule of embedded data resembles and the location of the granule of embedded data with regard to a subsequent instruction.

Alternatively, the software 730 may optionally include a means for inserting a constant size padding. This alternative approach advantageously reduces the complexity of the software 730 by not having to analyze embedded data encodings. In this alternative embodiment, the software 730 includes a means for detecting a transition between the end of embedded data segment and an instruction. The insertion means then inserts padding having a constant number of pad granules whenever a transition from an embedded data segment to an instruction is recognized. Each pad granule of the inserted padding may be suitably encoded to contain a valid instruction, having a length of one granule, already defined in the instruction set or may simply contain data having coding which does not resemble any instruction in the instruction set. An alternative padding encoding will be discussed further in connection with the discussion of FIG. 9 below.

To determine the number of pad granules composing the constant size padding to be inserted in the program code 740, the software 730 utilizes the various lengths of instructions that compose the instruction set supported by a target processor. The number of pad granules composing the constant size padding may be written as:

$$Pz = (\text{Max}(instrlen) - \text{Min}(instrlen))/\text{Min}(instrlen) \quad (1)$$

which simplifies to $$Pz = (\text{Max}(instrlen)/\text{Min}(instrlen)) - 1 \text{ and, for convenience,} \quad (2)$$

$$\text{MAX} = (\text{Max}(instrlen)/\text{Min}(instrlen)) \text{ thus simplifying,} \quad (3)$$

$$Pz = \text{MAX} - 1 \quad (4)$$

where Pz is the pad size in granules, Max(instrlen) is the length of the longest instruction in bits, Min(instrlen) is the length of the shortest instruction in bits, and MAX is the length of the longest instruction in granules. For example, in an instruction set having 32, and 16 bit instructions, one granule equals 16 bits, the shortest length instruction. The number of pads in granules would be (32 [bits]/16 [bits/granule])−1 which equals 1 granule or 16 bits. Thus, a pad containing a 16 bit instruction taken from the instruction set may be inserted wherever there is a transition between data and the next instruction.

By way of another example, in an instruction set having 32, 16, and 8 bit instructions, one granule equals 8 bits, the shortest instruction. The number of pads in granules would equal (32 [bits]/8 [bits/granule])−1 which equals 3 granules or 24 bits. Thus, the 24 bit padding may then be inserted wherever there is a transition between data and the next instruction. Other possible variations of what constitutes the 24 bit padding are further described below in connection with the discussion of FIG. 9. The contents of a variable length pad is described below in connection with FIG. 11.

Figure 8:
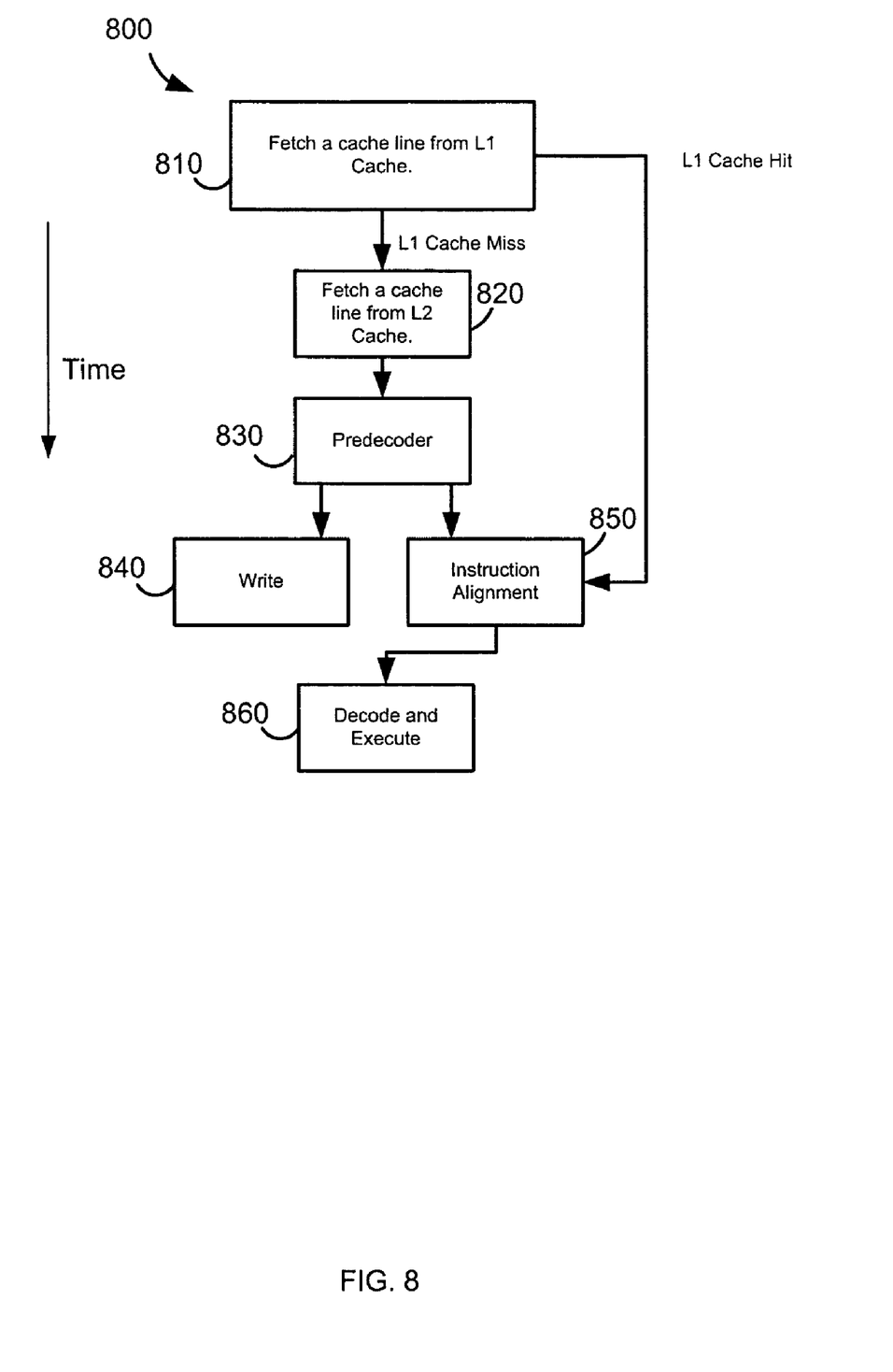
FIG. 8 is a block diagram of a processor pipeline which operates in accordance with an embodiment of the invention.

FIG. 8 is a block diagram of a processor pipeline 800 which operates in accordance with an embodiment of the invention. The processor pipeline 800 includes a fetch from a level 1 cache stage 810, a fetch from a level 2 cache 820, a predecoder 830, a write stage 840, an instruction alignment stage 850, and a decode and execute stage 860.

At the fetch from the level 1 cache stage 810, a cache line is fetched from the level 1 cache based on an address. The cache line may contain one or more program segments which may be similar to the exemplary program segments illustrated in FIGS. 3-6. If there is a cache miss, a cache line is fetched from a level 2 cache as shown in the fetch stage 820 and forwarded to the predecoder 830. The predecoder 830 identifies the number of granules which make up an instruction in the cache line. The predecoder 830 utilizes the number of granules to perform the appropriate predecode on the instruction. Once predecoding the instruction completes, the resulting predecode information is stored temporarily in a buffer and the next instruction in the cache line is predecoded. If there are no more granules to process in the cache line, the pipeline proceeds to the write stage 840. At the write stage 840, the predecoded information and the cache line are written to the level 1 cache. In parallel, the predecoder 830 transfers the cache line and predecode information to the instruction alignment stage 850. At the instruction alignment stage 850, the instructions in the cache line are aligned and are ready for a subsequent decode and execute stage 860.

It should be noted that the predecoder 830 does not predecode embedded data which does not resemble an instruction. However, if embedded data does resemble an instruction, the embedded data and potentially padding may be predecoded. As described above, such invalid predecode information is of no concern because when the program actually executes, by virtue of the flow of a program, a program counter will not be directed to execute embedded data or embedded padding. The embodiments of the invention are not limited to the illustrated pipeline 800 and are further applicable to any pipeline processor which includes a predecode operation that predecodes variable length instruction sets.

For program segments as shown in FIGS. 3-6, a predecoder will operate on the program segment on a granule by granule basis unless a granule is recognized as an instruction in the instruction set. When a granule is recognized as an instruction in the instruction set, one or more additional granules are checked to predecode the entire instruction. By encoding the contents of the padding to resemble instructions in the instruction set, the predecoder may track to the next instruction more efficiently.

Figure 9:
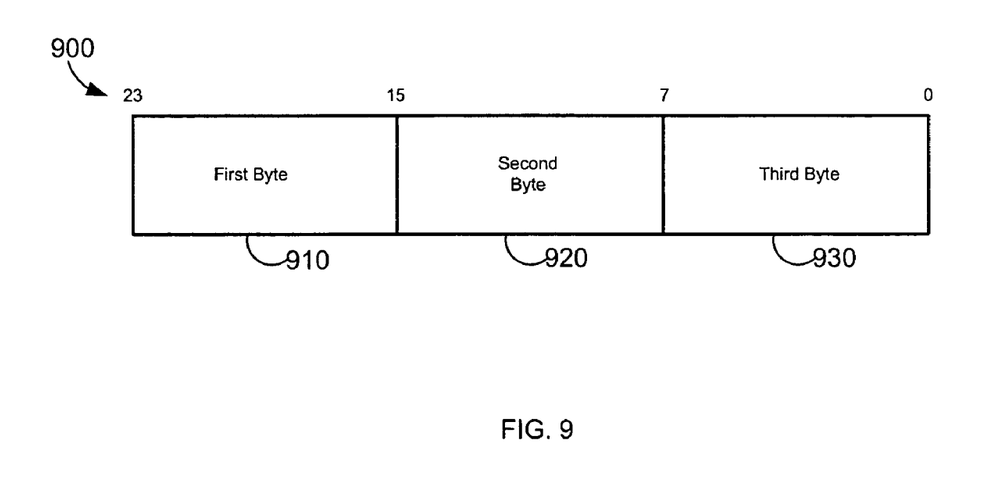
FIG. 9 illustrates a telescopic encoding approach for a constant size pad in accordance with an embodiment of the invention.

FIG. 9 illustrates a telescopic encoding approach for a constant size pad 900 for an instruction set having 32, 24, 16, and 8 bit instructions in accordance with an embodiment of the invention. According to formula (2) above, the maximum size pad is 3 granules or bytes for this particular variable length instruction set. The pad 900 would be inserted whenever a transition is found between embedded data and a subsequent instruction at the end of the embedded data. This pad 900 may consist of data that will not be recognized as a granule of an instruction. Alternatively, pad 900 may consist of varying combinations of instructions taken from the instruction set. For example, the padding may contain three 8 bit instructions or a telescoping encoding. A telescoping encoding may contain a first byte 910 encoded to be recognized as the first byte of a 24 bit instruction, a second byte 920 which is encoded to be recognized as the first byte of a 16 bit instruction, and a third byte 930 which is encoded to be recognized as an 8 bit instruction. By telescoping the encodings of the 24 bit pad 900, the predecoder 830 would be able to synchronize with the subsequent instruction after the 24 bit padding 900 regardless of where in the 24 bit pad the predecode operation terminates by incorrectly decoding embedded data as an instruction.

Figure 10:
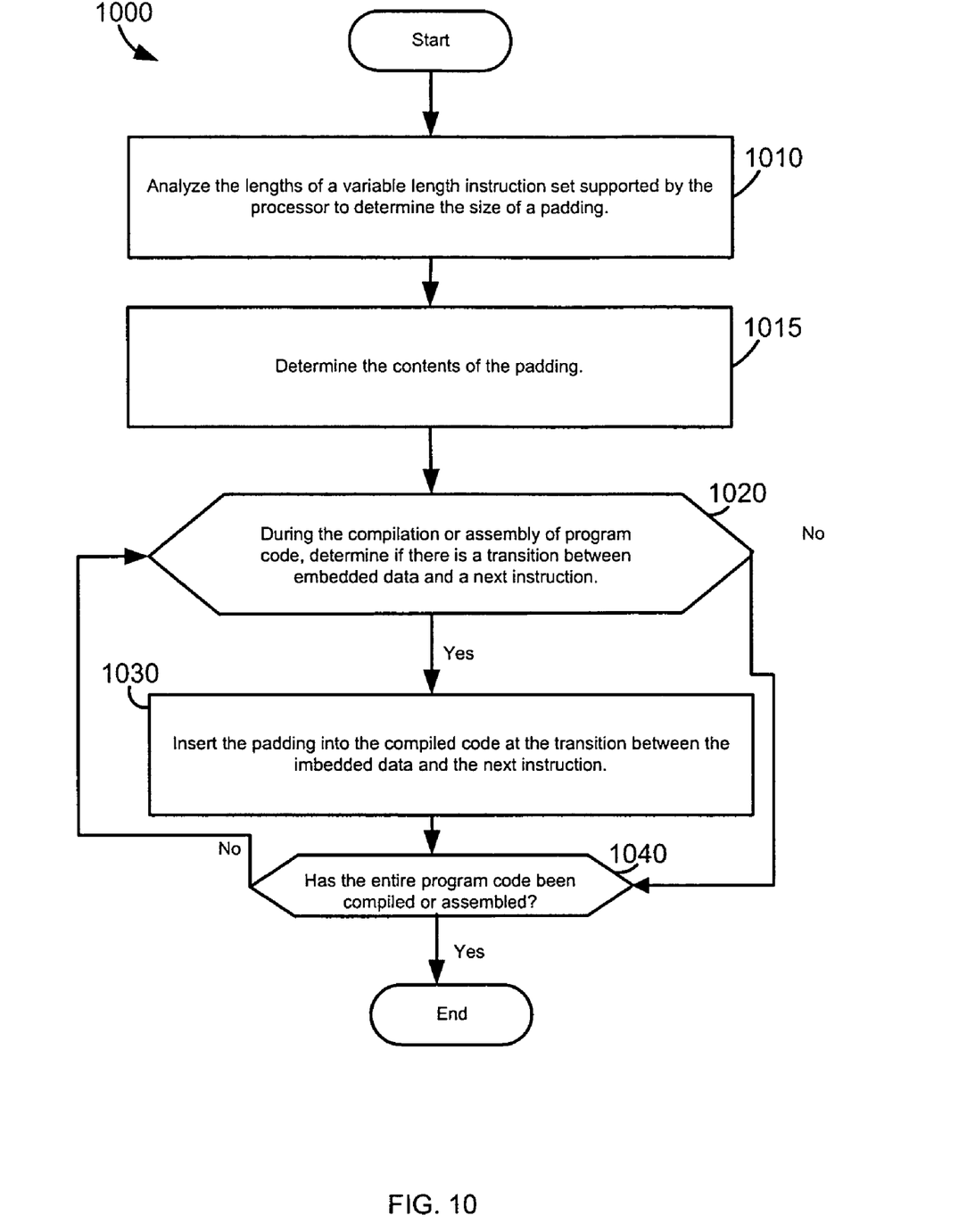
FIG. 10 is a flow chart illustrating a method for inserting constant size padding into program code in accordance with the first embodiment of the invention.

FIG. 10 is a flow chart illustrating a method 1000 for inserting constant size padding into program code such as program code 740 in accordance with the first embodiment of the invention. Software 730 as described above executing on a computer 710 may implement the steps of method 1000. At step 1010, the method analyzes the lengths of a variable length instruction set supported by a pipeline processor to determine the size of the padding. In step 1010, equation (2) above is used to determine the size of the padding. At step 1015, the content of the padding is determined. One example is to compose the padding of a known instruction from the instruction set whose length equals the padding size. For example, in a variable length instruction set having both 16 and 32 bit instructions, the padding size is 16 bits. Thus, select a 16 bit instruction from the instruction set to be inserted as padding. In another example, construct the padding by selecting a shortest instruction from the instruction set and concatenating it multiple times until it reaches the same size of the padding. A further example would be to devise a telescoping encoding or to select a telescoping instruction from the instruction set as described in FIG. 9, if one exists. In another example, the padding could contain data which is distinct from the instructions in the instruction set. As described above in connection with FIG. 3, predecode information resulting from predecoding embedded data or padding is of no concern because the program flow would not normally cause embedded data or padding to be executed. It will be recognized that, alternatively, an execution stage may be modified to recognize padding in the unlikely situation where the execution stage attempts to execute embedded data or padding.

At step 1020, during program code generation by either a software compiler or assembler step, the method determines if there is a transition point between embedded data and a next instruction. If there is no embedded data, the method proceeds to step 1040. If there is embedded data, the method proceeds to step 1030. At step 1030, the padding is inserted into the program code at the transition point between the embedded data and the next instruction. At step 1040, the method determines if program code generation is complete. If it is, method 1000 ends and program code has been generated with padding inserted therein. If it is not, method 1000 proceeds to step 1020 where it continues to insert padding at transitions between embedded data and subsequent instructions. When the method completes, the generated program code will contain padding so as to allow a predecoder to correctly recognize variable length instructions as instructions if embedded data resembles an instruction.

Figure 11:
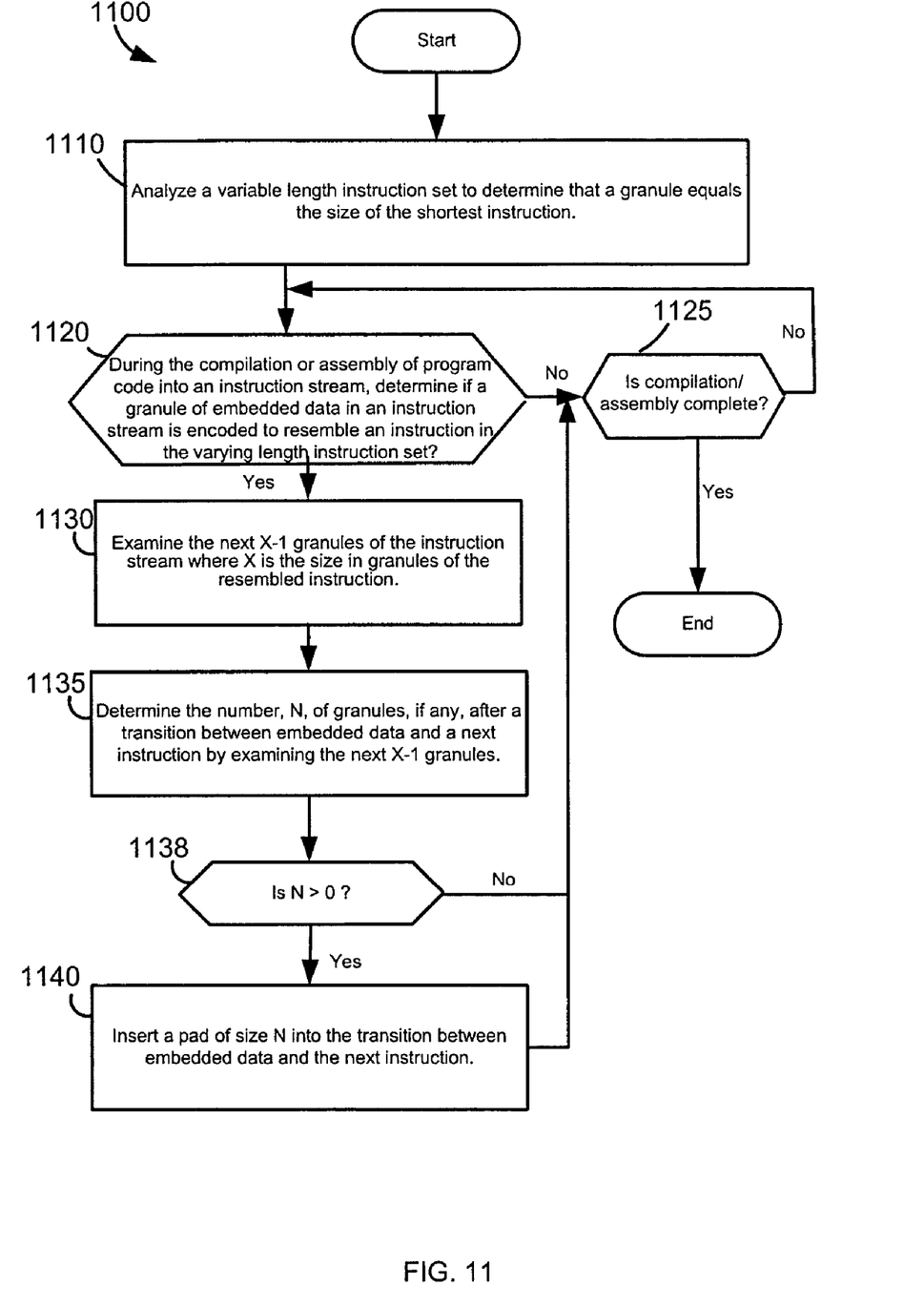
FIG. 11 is a flow chart illustrating a method for inserting variable size padding into program code in accordance with the second embodiment of the invention.

FIG. 11 is a flow chart illustrating a method 1100 for inserting variable size padding into program code in accordance with the second embodiment of the invention. Software 730 as described above executing on a computer 710 may implement the steps of method 1100. At step 1110, the method analyzes a variable length instruction set to determine that a granule equals the size of the shortest instruction. Alternatively, the method could simply know or be told the granule size. This step may be embodied as setting a compiler option on the software 730 which informs the software 730 of the shortest length instruction in the instruction set. Alternatively, since the software 730 generates program code which includes instructions from the instruction set, the software 730 may already know the length of the shortest instruction such that this step merely involves reading a variable during execution of the software 730 to determine the size of one granule. At step 1120, during the compilation or assembly of program code into an instruction stream, the method 1100 determines if a granule of embedded data such as a constant in the instruction stream is encoded to resemble an instruction from the varying length instruction set. If not, the method 1100 proceeds to step 1125. At step 1125, the method determines if compilation or assembly is complete. If it is, method 1100 ends. Otherwise, the method 1100 continues by proceeding to step 1120.

Returning to step 1120, if a granule of embedded data is encoded so that it resembles an instruction, method 1100 proceeds to step 1130. At step 1130, the method 1100 examines the next X−1 granules of the instruction stream where X is the size in granules of the resembled instruction. At step 1135, the method 1100 determines the number, N, of granules, if any, after a transition between embedded data and a next instruction by examining the next X−1 granules, starting after the granule of embedded data encoded to resemble an instruction.

In other words, this determination step considers the number of granules a subsequent predecoder would check to complete predecoding the instruction which the granule of embedded data resembles. For example, if a granule is one byte and a granule of data resembles the first byte of a 32 bit instruction, method 1100 examines the next three bytes from the instruction stream to determine if there is a transition from embedded data to the next instruction.

The method 1100 proceeds to step 1138 where it determines whether N is greater than zero. If N is not greater than zero, the granule of embedded data that resembles an instruction will have no bearing on a subsequent predecoder because the amount of displacement caused by a potential predecode error is still within the embedded data having a resembled instruction. Thus, the method proceeds to step 1125. If N is greater than zero, the method proceeds to step 1140. At step 1140, the method 1100 inserts a pad into the transition between embedded data and the next instruction. The inserted pad has a size, N, equal to the number of granules that passed the transition between embedded data and the next instruction found in step 1130. When the method completes, the generated program code will contain padding so as to allow a predecoder to correctly recognize variable length instructions as instructions when embedded data resembles an instruction.

Since FIG. 5 shows an illustrative result of method 1100, let's refer to FIG. 5 without padding 530 for example. Recalling that data byte 526 coincidentally resembles the first 8 bits of a 24 bit instruction and that one granule is equal to 8 bits, the method 1100 would examine the next X−1, or two, granules after data byte 526. In examining the first granule, method 1100 would recognize the 8 bit STOR instruction 516 and determine that a transition from embedded data to an instruction occurred. In examining the second granule, the method 1100 would recognize the first byte of the MULT instruction 518. Since the first byte of the MULT instruction 518 is two granules away from the transition, N equals two granules. Consequently, two granules of padding 530 are then inserted at the transition as shown in FIG. 6. When the compilation or assembly completes, the program code may contain inserted padding having different lengths.

While the invention is disclosed in the context of embodiments, it will be recognized that a wide variety of implementations may be employed by persons of ordinary skill in the art consistent with the above discussion and the claims which follow below.

We claim:

1. A method to ensure correct predecoding of instructions in an instruction string containing instructions from an instruction set architecture and an embedded data segment, the instruction set architecture having instructions of varying length, the length of the smallest instruction in the instruction set architecture defining a granule, the number of granules that compose the longest length instruction in the instruction set architecture defining a number MAX, the method comprising: determining the end of a first embedded data segment in an instruction string, when a program is compiled or assembled into the instruction string; and inserting a padding of length, MAX−1 granules, to the end of the first embedded data segment to form a padded instruction string; and storing the padded instruction string.

2. The method of claim 1 wherein the padding is encoded to be distinct from any instruction in the instruction set architecture.

3. The method of claim 1 wherein the padding is encoded to include a plurality of instructions from the instruction set architecture concatenated to each other.

4. The method of claim 1 wherein the padding is telescopically encoded to synchronize predecoding of embedded data at the end of the first embedded data segment.

5. The method of claim 4 wherein the longest instruction is 32 bits, the shortest instruction is 8 bits, other instructions are 24 and 16 bits, the padding is three bytes and the telescopically encoded padding has a first byte which appears to be the first byte of a 24 bit instruction, a second byte which appears to be the first byte of a sixteen bit instruction and a third byte which appears to be an 8 bit instruction.

6. The method of claim 1 wherein the determining the end of the embedded data segment step further comprises:
recognizing a transition when a subsequent instruction in the instruction string follows the embedded data segment.

7. The method of claim 1 wherein the shortest instruction is 8 bits.

8. The method of claim 1 further comprising:
determining the end of a second embedded data segment, and
inserting a padding of length, MAX−1 granules, to the end of the second embedded segment.

9. The method of claim 1 wherein the shortest instruction is 16 bits.

10. The method of claim 9 wherein and the longest instruction is 32 bits.

11. A method to ensure correct predecoding of instructions in an instruction string containing instructions from an instruction set architecture and embedded data, the instruction set architecture having instructions of varying length, the smallest length instruction in the instruction set architecture defining a granule, the method comprising: determining if a granule of embedded data in an instruction string is encoded to resemble an instruction in the instruction set architecture; examining at least the next X−1 granules of the instruction string for a transition between embedded data and a next instruction, where X is the size in granules of the resembled instruction; determining the number, Y, of granules not found when examining the X−1 granules due to finding the transition between embedded data and a next instruction within the sequence of X−1 granules examined; and inserting a padding of size Y after the transition, if Y is greater than 0 to form a padded instruction string; and outputting the padded instruction string.

12. The method of claim 11 wherein the padding is encoded to be distinct from any instruction in the instruction set architecture.

13. The method of claim 11 wherein the padding is encoded to include a plurality of instructions from the instruction set architecture concatenated to each other.

14. The method of claim 11 wherein the padding is telescopically encoded.

15. The method of claim 11 wherein the shortest instruction is 8 bits.

16. The method of claim 11 wherein the shortest instruction is 16 bits.

17. A computer readable medium including program code stored thereon, comprising:
first program code for reading an string of instructions containing at least one segment of embedded data;
second program code for identifying data at the end of the at least one segment of embedded data as resembling a variable length instruction;
third program code for inserting, based on the identified data, padding contiguous to the at least one segment of embedded data to form a padded string of instructions; and
fourth program code for storing the padded string of instructions.

18. The computer readable medium of claim 17 wherein the length of the smallest instruction in a variable length instruction set architecture defines a granule and the length of the largest instruction is a multiple of one or more granules, MAX, wherein said padding is of a padding size equal to MAX−1 granules.

19. A computer system for ensuring correct predecoding of instructions in a padded instruction string, an instruction string containing instructions from an instruction set architecture and embedded data, the instruction set architecture having instructions of varying length, the smallest length instruction in the instruction set architecture defining a granule, the number of granules that compose the longest length instruction in the instruction set architecture defining a number MAX, the computer system comprising: means for detecting a transition where a consecutive instruction follows embedded data in the instruction string; means for inserting a padding of length, MAX−1 granules, after the embedded data forming the padded instruction string; and hardware means for storing the padded instruction string.

20. A computer readable medium including program code stored thereon, comprising: first program code for determining a number of granules that compose the longest length instruction in an instruction set architecture, MAX; second program code for detecting a transition in an instruction string where a consecutive instruction follows embedded data; and third program code for inserting a padding of length, MAX−1 granules after the embedded data forming a padded instruction string; and fourth program code for storing the padded instruction string.

* * * * *